(12) United States Patent
Lamla et al.

(10) Patent No.: US 7,636,438 B1
(45) Date of Patent: Dec. 22, 2009

(54) DATA MEDIUM AUTHENTICATION METHOD

(75) Inventors: Michael Lamla, München (DE); Hermann Drexler, München (DE); Wolfgang Rankl, Frauenau (DE); Franz Weikmann, München (DE); Wolfgang Effing, Gilching (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 09/486,723

(22) PCT Filed: Sep. 7, 1998

(86) PCT No.: PCT/EP98/05669

§ 371 (c)(1),
(2), (4) Date: May 18, 2000

(87) PCT Pub. No.: WO99/13436

PCT Pub. Date: Mar. 18, 1999

(30) Foreign Application Priority Data

Sep. 9, 1997 (DE) .............................. 197 39 448

(51) Int. Cl.
*H04L 9/32* (2006.01)
*G06F 7/04* (2006.01)

(52) U.S. Cl. ......................... 380/33; 726/16; 726/17; 726/20; 713/168

(58) Field of Classification Search ................. 380/270, 380/33–34; 705/64, 67; 713/185, 169, 170, 713/172, 201, 200
See application file for complete search history.

(56) References Cited

U.S. PATENT DOCUMENTS 3,806,874 A * 4/1974 Ehrat .......................... 713/185

(Continued)

FOREIGN PATENT DOCUMENTS

GB 2 298 613 A 9/1996

OTHER PUBLICATIONS

"ISO 7816—Wikipedia, the free encyclopedia", pp. 1-5, last visited: Nov. 8, 2006.*

*Primary Examiner*—Ponnoreay Pich
(74) *Attorney, Agent, or Firm*—Bacon & Thomas, PLLC

(57) ABSTRACT

The invention relates to a method for testing the authenticity of a data carrier (1) and/or an external device (2) which enters into data exchange with the data carrier (1). According to the invention, the data carrier (1) and the external device (2) are each equipped with a special additional apparatus (4, 6) for generating and/or testing authenticity data. Data transmission between the data carrier (1) and the external device (2) as required for authenticity testing is performed at least partly via a special transmission channel (B). The transmission channel (B) for transmitting authenticity data is separated physically or logically from a transmission channel (A) for transmitting standard data so that there is no mutual interference of data transmission via the two transmission channels (A, B). In authenticity testing, the additional apparatuses for generating and/or testing authenticity data (4, 6) of the data carrier (1) and external device (2) and optionally also the transmission channel (B) for authenticity data must meet special demands which cannot be met by conventional designs. The transmission channel (B) for transmitting authenticity data is activable during the total time period between activation and deactivation of the data carrier (1) so that authenticity testing can be performed anytime.

14 Claims, 2 Drawing Sheets

U.S. PATENT DOCUMENTS

| | | | |
|---|---|---|---|
| 4,726,014 A * | 2/1988 | Goldman et al. | 370/328 |
| 4,837,556 A * | 6/1989 | Matsushita et al. | 340/310.01 |
| 4,985,921 A | 1/1991 | Schwartz | |
| 5,204,902 A * | 4/1993 | Reeds et al. | 380/248 |
| 5,309,564 A * | 5/1994 | Bradley et al. | 398/45 |
| 5,553,239 A * | 9/1996 | Heath et al. | 726/2 |
| 5,808,760 A * | 9/1998 | Gfeller | 398/27 |
| 5,818,814 A * | 10/1998 | Testani et al. | 370/212 |
| 5,852,653 A * | 12/1998 | Reel et al. | 379/88.21 |
| 5,878,134 A * | 3/1999 | Handelman et al. | 340/5.6 |
| 5,878,142 A * | 3/1999 | Caputo et al. | 713/159 |
| 5,894,425 A * | 4/1999 | Saliba | 710/62 |
| 6,041,357 A * | 3/2000 | Kunzelman et al. | 709/228 |
| 6,373,946 B1 * | 4/2002 | Johnston | 380/211 |
| 6,654,466 B1 * | 11/2003 | Ikefuji et al. | 380/270 |

* cited by examiner

DATA MEDIUM AUTHENTICATION METHOD

The current application is a national stage entry of PCT/EP98/05669 whose international filing date is Sep. 7, 1998 and which claims foreign priority to German application 19739448.5, filed Sep. 9, 1997.

BACKGROUND OF THE INVENTION

This invention relates to a method for testing the authenticity of a data carrier. The invention further relates to the data carrier used in said method and to a system comprising the data carrier and an external device.

To prevent unauthorized production and replication of data carriers or the use of such data carriers, it is necessary to be able to test the authenticity of a data carrier with a high measure of reliability. It is also necessary in many cases to be able to test the authenticity of an external device communicating with the data carrier.

A method for testing the authenticity of a data carrier is known from DE 44 19 805 A1. In the known method the data carrier used has at least one integrated circuit with memory units and logical units and a data line for data exchange with an external device. The integrated circuit additionally has a separate hardwired circuit for transmitting and/or receiving data during the power-up sequence. Said separate circuit is used for authenticity testing, the first transmission or reception of data being completed within a defined time domain of the power-up sequence in which no defined state is specified for the data line by ISO standard 7816. Data relevant for authenticity testing are transmitted between data carrier and external device either via a data line on which other data are also exchanged between data carrier and external device or via other lines which do not meet this standard data line and are currently reserved for future applications.

SUMMARY OF THE INVENTION

The problem of the invention is to state a method for testing the authenticity of a data carrier and/or an external device which can be used flexibly and simultaneously offers a very high security standard.

The basic idea of the invention is to equip the data carrier and external device each with a special additional apparatus for generating and/or testing authenticity data and to perform the data transmission between data carrier and external device necessary for authenticity testing at least partly via a special transmission channel, the additional apparatuses for generating and/or testing the authenticity data and optionally also the transmission channel making special demands on the data carrier or external device which cannot be met by conventional designs.

The invention has the advantage of permitting very reliable authenticity testing without using the standard transmission channel between data carrier and external device or being dependent on the standard transmission channel.

Further, the invention offers very good protection from impermissible reproduction of the data carrier or external device since the inventive additional apparatuses for generating and/or testing authenticity data and the inventive additional transmission channel for authenticity testing are not present in conventional data carriers and external devices, thereby making it difficult for unauthorized persons to procure the required components. This hurdle for impermissible reproduction can be made even higher if the additional apparatuses for generating and/or testing authenticity data and the transmission channel for authenticity testing presuppose a technology in the data carrier or external device which can be procured only with great difficulty or not at all by an unauthorized person. This technology preferably resides at least partly in a different technical area from the technologies required for producing conventional data carriers.

In authenticity testing of the data carrier the additional apparatus of the data carrier generates authenticity data and communicates them to the external device via the specially provided transmission channel. The external device tests the communicated authenticity data and decides on the authenticity of the data carrier. This decision can additionally be made contingent on whether a connection exists between the additional apparatus of the data carrier and a microcontroller disposed in the data carrier.

Depending on security requirements and special circumstances of the application, one performs the data transmission necessary for authenticity testing using at least one transmission channel separated either logically or physically from the standard transmission channel.

Logical separation can be attained for example by using the same line or transmission path for transmitting authenticity data as for transmitting other data but coding authenticity data on this line or transmission path in such a way that they can be separated from other data and do not impair transmission of other data. For coding authenticity data one can use tolerances permitted by the ISO standard for voltage level or for localization in time of the transition between different logic levels of the signals of the standard transmission channel. Since this kind of coding does not exceed tolerances specified by the ISO standard for voltage levels or transitional behavior of the signals, this kind of data transmission is ISO-compatible. For applications outside the ISO standard the stated tolerance ranges can be exceeded. An advantage of the described data transmission is in addition that one can fall back on existing lines and thus need not install additional lines or other transmission paths. Instead of the line of the standard transmission channel one can also fall back on other lines, for example the line for the supply voltage or the line for the clock signal or also a contactless transmission path. The only important thing is that the line or transmission path used permits a connection to be made between data carrier and external device for the purpose of transmitting authenticity data.

However, physical separation of the transmission channel for transmitting authenticity data from the standard transmission channel has the advantage of opening up almost unlimited possibilities of variation for realizing the authenticity testing method. This permits technical effort and thus also costs, on the one hand, and the desired security standard, on the other hand, to be optimally adapted to the particular application. Since compatibility with an existing line or transmission path can be disregarded, one can use for example a highly complex and limitedly available additional apparatus of any construction for generating the data to be transmitted which identifies the data carrier or external device as authentic and thus makes it virtually impossible to imitate these components. For example, one can also use a great variety of contactless transmission techniques in this connection.

BRIEF DESCRIPTION OF THE DRAWINGS

Further advantageous embodiments and developments are described in the following and shown in the drawings, in which.

DESCRIPTION OF THE PREFERRED EMBODIMENTS

Figure 1:
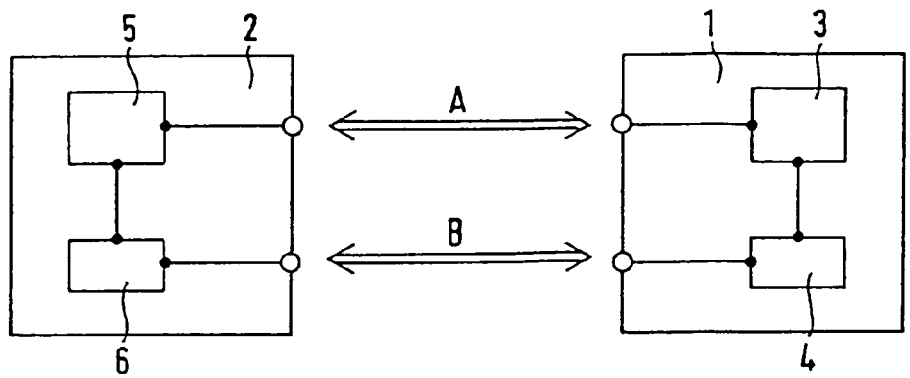
FIG. 1 shows a block diagram to illustrate the basic principle of the invention.

FIG. 1 shows a block diagram to illustrate the basic principle of the invention. Chip card 1 has microcontroller 3 and additional apparatus 4 for generating and testing authenticity data. Microcontroller 3 of chip card 1 is connected with microcontroller 5 of external device 2 via first transmission channel A, which normally corresponds to the standard data line. Transmission channel A and also further transmission channels are shown by double arrows indicating the direction of data transmission. Via transmission channel A transactions are completed in known fashion between chip card 1 and external device 2, which may be for example a POS terminal or an automatic teller machine, etc. Data transmission via transmission channel A follows a transmission protocol defined by ISO standard 7816. In known systems the complete authenticity testing of chip card 1 or external device 2—if necessary for the particular application—is also performed via transmission channel A. This authenticity testing can be performed for example in the form of a reciprocal authentication method on the challenge and response principle.

According to the invention, further transmission channel B is present in addition to transmission channel A for connecting additional apparatus 4 of chip card 1 with additional apparatus 6 of external device 2. Further, microcontrollers 3, 5 and additional apparatuses 4, 6 are interconnected, respectively. Data required by chip card 1 or external device 2 for authenticity testing which were previously generated by additional apparatus 4 or 6 are transmitted via transmission channel B. Authenticity data received by other additional apparatus 6 or 4 are evaluated and it is decided whether chip card 1 or the external device is authentic. Additional apparatus 4 of chip card 1 can be part of the module bearing microcontroller 3. Additional apparatus 6 of external device 2 will normally be realized as a separate module, referred to as a secure application module (abbreviated as SAM) and executed in the form of a chip card.

The method for testing the authenticity of chip card 1 by external device 2 can take place as follows.

External device 2 communicates input data, for example a random number, to chip card 1 via transmission channel B. Additional apparatus 4 of chip card 1 uses the input data to generate authenticity data and communicates the authenticity data to external device 2 via transmission channel B. External device 2 receives the authenticity data and decides on the authenticity of chip card 1 on the basis of the received authenticity data by means of additional apparatus 6.

The described method can be modified insofar as authenticity data can be generated by additional apparatus 4 of chip card 1 without input data from external device 2, or generation of authenticity data can already be begun before the input data are completely transmitted. Further modifications can be to transmit the input data or authenticity data via transmission channel A. A plurality of different methods can be used for generating the authenticity data. For example the authenticity data can be calculated from the input data or the authenticity data can be generated by exploiting special physical effects, optionally in accordance with material properties of the additional apparatus. The important thing in all methods for generating the authenticity data is that the latter cannot be simulated by unauthorized third parties with apparatuses having the outer dimensions of chip card 1. Such simulation could be, if the authenticity data are calculated, to implement the algorithm processed by additional apparatus 4 on a powerful computer. In order to prevent this one should design additional apparatus 4 so that its computing power is far above that attainable with available microcontrollers.

In the variant of the invention shown in FIG. 1, both transmission channel A and transmission channel B permit bidirectional data exchange, i.e. data exchange from chip card 1 to external device 2 and data exchange from external device 2 to chip card 1. The separation between transmission channel A and transmission channel B can be of either a physical or a logical nature. With physical separation of the transmission channels one selects for transmission channel B a separate transmission path completely independent from transmission channel A. One can thus for example provide an additional line between chip card 1 and external device 2, or contactless transmission can take place between chip card 1 and external device 2 which is independent from standard data transmission via transmission channel A. With logical separation of transmission channels A and B, transmission channels A and B are physically one and the same transmission channel, i.e. one and the same line or one and the same contactless transmission path. However, one uses different signals for data transmission, which can be separated from each other by chip card 1 or terminal 2.

Figure 2:
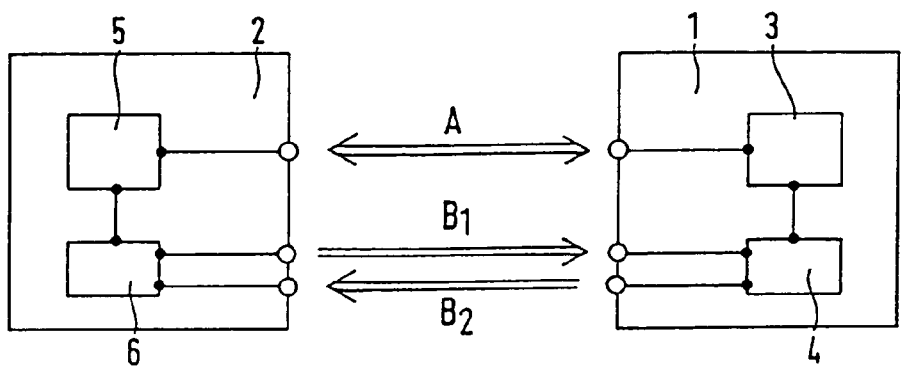
FIG. 2 shows a variant of the block diagram of FIG. 1, FIGS. 3a and 3b show block diagrams of embodiments of the inventive systems wherein authenticity data are transmitted via the standard data line.

FIG. 2 shows a block diagram of a form of the invention somewhat modified over FIG. 1. Chip card 1 and the external device are again interconnected via bidirectional line A used for standard data exchange. This line is a realization of transmission channel A in, case chip card 1 is a contact-type chip card. If contactless chip card 1 is to be used instead, transmission channel A is not realized in the form of a line but by a contactless transmission path via which data are transmitted for example as electromagnetic, electrostatic, magnetic, acoustic or optical signals. This different design of transmission channel A is also applicable in the form of the invention shown in FIG. 1. In contrast to FIG. 1, data required for authenticity testing are communicated via two separate transmission channels $B_1$ and $B_2$ according to FIG. 2. Transmission channel $B_1$ is used for data transmission from external device 2 to chip card 1 and transmission channel $B_2$ for data transmission in the reverse direction. Transmission channels $B_1$ and $B_2$ can be separated either logically or physically from each other and from transmission channel A.

In a development of the invention, one of transmission channels $B_1$ or $B_2$ can be identical with transmission channel A, i.e. authenticity data or data required for authenticity testing can be transmitted partly via transmission channel A. In all embodiments of the invention it is fundamentally possible to integrate transmission channel A into the authenticity testing method, i.e. communicate part of the data transmitted in this method via transmission channel A.

Division of the transmission channel for data required for authenticity testing into transmission channels $B_1$ and $B_2$ as shown in FIG. 2 can be necessary in particular when the signals formed by chip card 1 and external device 2 in the authenticity testing method are so different physically that transmission via the same channel is impossible. This may be the case for example when only the authenticity of chip card 1 is to be tested and chip card 1 emits for authenticity testing special electromagnetic signals which can be generated only with authentic additional apparatus 4. The electromagnetic signals are then communicated via transmission channel $B_2$, and control signals influencing the generation of the electromagnetic signals can be transmitted from external device 2 to chip card 1 via transmission channel $B_1$.

Figure 3A:
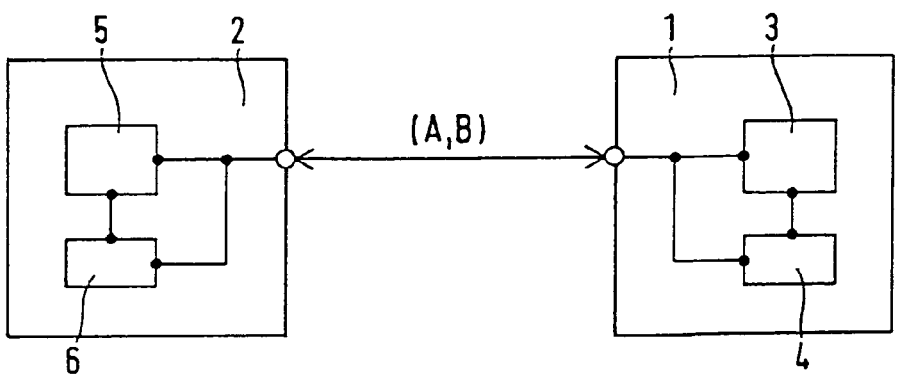

FIG. 3a shows a block diagram for an embodiment of the invention wherein data required for authenticity testing are transmitted between chip card 1 and external device 2 via the standard data line, i.e. transmission channel A for standard data and transmission channel B for authenticity data are bound to the same line so that the separation between channels A and B is not physical but only logical. Unlike FIGS. 1 and 2, FIG. 3a does not show transmission channels A and B themselves but rather a realization of the channels in the form of the standard data line. In order to ensure differentiation from the representation of the transmission channels, the lines or transmission paths are shown as simple arrows. It is stated in parentheses which transmission channels are realized by the particular line or transmission path.

Within chip card 1 microcontroller 3 and additional apparatus 4 are connected with the standard data line. Further, microcontroller 3 and additional apparatus 4 are interconnected. Logical separation of transmission channels A and B is effected by microcontroller 3 and additional apparatus 4, which executes essential parts of the authenticity testing method, each filtering out the signals relevant for them or subjecting the standard data line to the signals generated by them. If this should be necessary, synchronization or data exchange is possible via the connecting line between microcontroller 3 and additional apparatus 4.

External device 2 can be constructed in a similar way to chip card 1 and contain microcontroller 5 and additional apparatus 6 which are connected with the standard data line and with each other. The system shown in FIG. 3a can transmit data required for authenticity testing in a digital form via the standard data line. A signal pattern possible in this connection is shown in FIG. 4a and described in the corresponding text.

Figure 3B:
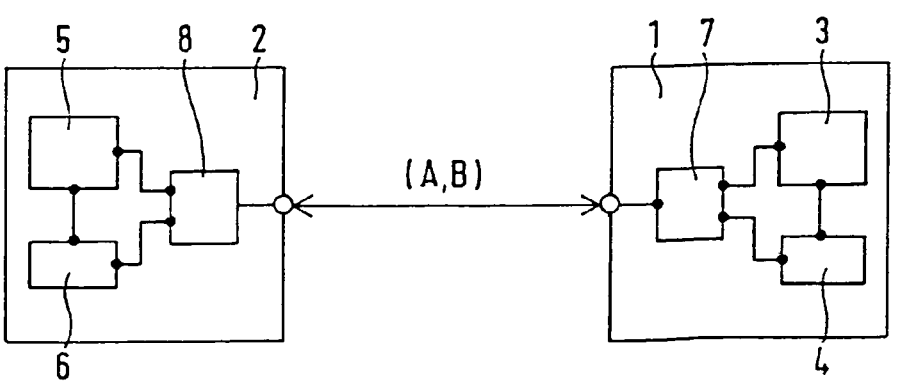

FIG. 3b shows a block diagram of an embodiment of the inventive system wherein data required for authenticity testing are transmitted in the form of digital or analog signals via the standard data line. As in FIG. 3a, transmission channels A and B for standard data and authenticity data are again separated not physically but only logically. On the part of chip card 1 the logical separation of transmission channels A and B is effected by mixing/demixing module 7 which splits signals from the standard data line into standard data signals and authenticity data signals or brings together signals for standard data and signals for authenticity data for transmission via the standard data line. For this purpose, mixing/demixing module 7 is connected with the standard data line, on the one hand, and with microcontroller 3 and additional apparatus 4, on the other hand. Further, microcontroller 3 and additional apparatus 4 are interconnected. External device 2 is constructed analogously and likewise has mixing/demixing module 8 connected with the standard data line and with microcontroller 5 and additional apparatus 6. In external device 2 microcontroller 5 and additional apparatus 6 are also interconnected. The system shown in FIG. 3b can process not only the analog signal patterns shown in FIGS. 4b and 5b but also the digital signal patterns shown in FIGS. 4a and 5a.

Figure 4A:
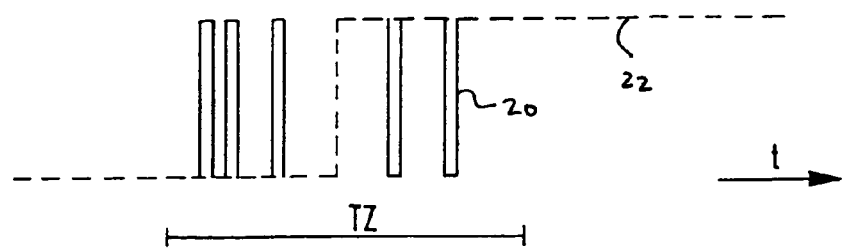
FIGS. 4a and 4b show signal patterns over time on the standard data line in case authenticity data are transmitted within transition regions defined in the area of the signal edges of standard data.

FIG. 4a shows a signal pattern on the standard data line of the system shown in FIG. 3a. The signal level is shown as a function of time t. The standard data line transmits both the dashed-line signals 22 of transmission channel A, i.e. standard data, and the signals 20 of transmission channel B shown in the form of continuous lines, i.e. authenticity data. Since transmission of standard data via the standard data line is defined by ISO standard 7816 and transmission of authenticity data is to be effected in conformity with ISO without impairing the standard data and at high speed, one has used transition regions TZ defined in the ISO standard which are disposed at the beginning and end of each data signal and within which the signal is not scanned and evaluated. The signal pattern within the transition regions thus has no influence on the evaluation of the signal according to ISO standard 7816 and can be used for transmitting authenticity data. For this purpose, the authenticity data are modulated upon the signal for the standard data by means of a suitable modulation method, e.g. a, amplitude modulation, frequency modulation, pulse-coded modulation, etc. For scanning and evaluating the authenticity data one then of course requires an additional device since a chip card designed solely by the ISO standard would overlook authenticity data contained in the transition regions. Thus, additional apparatus 4 not present in conventional chip cards is already required for reading the authenticity data, which considerably impedes unauthorized reproduction of inventive chip card 1. Additional apparatus 4, which is not present in standard chip cards, is also necessary for transmitting authenticity data within the transition region and ultimately also for generating authenticity data. Corresponding additional apparatus 6 is also required in external device 2. One thus attains a very high security level altogether.

Figure 4B:
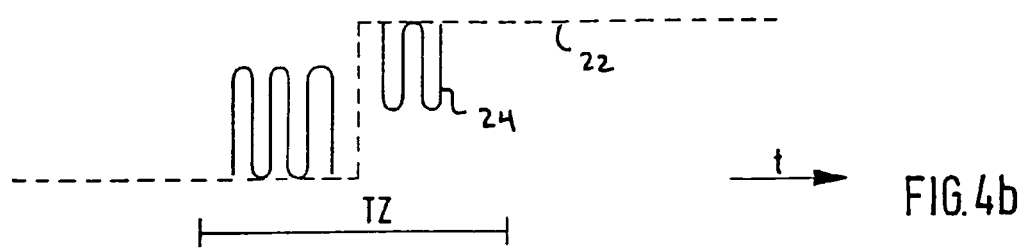

FIG. 4b shows a signal pattern over time on the standard data line which differs from the pattern shown in FIG. 4a in that authenticity data are transmitted as analog signals 24. Otherwise the signal pattern in FIG. 4b meets the same criteria as underlie FIG. 4a, i.e. authenticity data are communicated within transition regions TZ of standard data and one can use the modulation methods stated for FIG. 4a. Processing of the signals shown in FIG. 4b is effected using the system according to FIG. 3b. The system shown in FIG. 3a is unsuitable since mixing/demixing modules 7 and 8 shown in FIG. 3b are required for separating and bringing together signals for authenticity data and signals for standard data. The use of analog signals for data transmission impedes unauthorized reproduction of chip card 1 or external device 2 even further since this requires additional know-how for integrating the required analog technology into chip card 1. This knowledge of digital technology required for constructing conventional chip cards is insufficient alone.

Figure 5A:
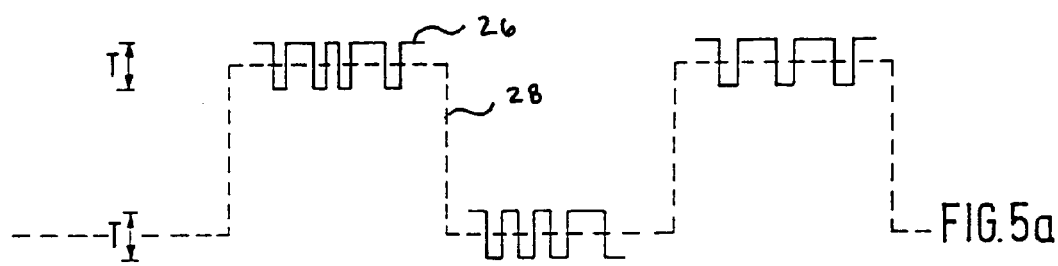
FIGS. 5a and 5b show signal patterns over time on the standard data line in case authenticity data are impressed on the signal for standard data as small voltage fluctuations.

FIG. 5a shows the signal pattern on the standard line for a variant of logical separation of transmission channels A and B. The signal 28 for standard data is dashed, the signal 26 for authenticity data is continuous. In this embodiment, tolerance T permitted by ISO standard 7816 for the signal level of standard data is used for transmitting authenticity data. For this purpose the authenticity signal is superimposed on the standard data signal, the level of the authenticity signal being within the permissible tolerance range of the signal for standard data. One must make sure that the actually occurring level fluctuations of the standard data signal together with the superimposed authenticity signal do not cause tolerance range T to be exceeded. Besides the standard data signal, the basic signal for superimposition selected can be any signal, e.g. the clock signal or the signal for the operating voltage. In all cases authenticity data can be transmitted via existing lines or transmission paths, the signals transmitted via the same line or transmission path being separated only logically.

Figure 5B:
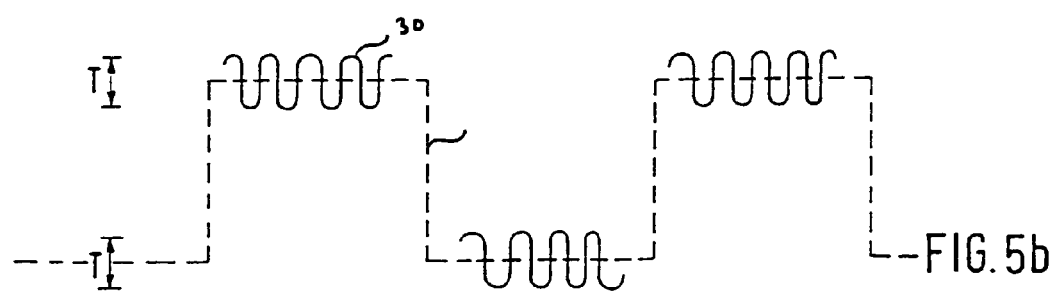

FIG. 45b shows the time behavior of signals meeting similar conditions to the signals according to FIG. 5a. the main difference over FIG. 5a is that authenticity data Are transmitted by means of analog signals 30, i.e. in contrast to FIG. 5a the originally existing signal is superimposed not by a digital signal but by an analog signal, tolerance range T also being taken into account here. Like the signal pattern according to FIG. 5a, the signal pattern according to FIG. 5b is processed or generated with the system shown in FIG. 3b. Mixer/demixer 8, 8 is again used for superimposing and separating the analog or digital authenticity signal and the originally existing signal.

The modulation methods described for FIG. 4a can also be used in the embodiments according to FIGS. 5a and 5b.

Figure 6:
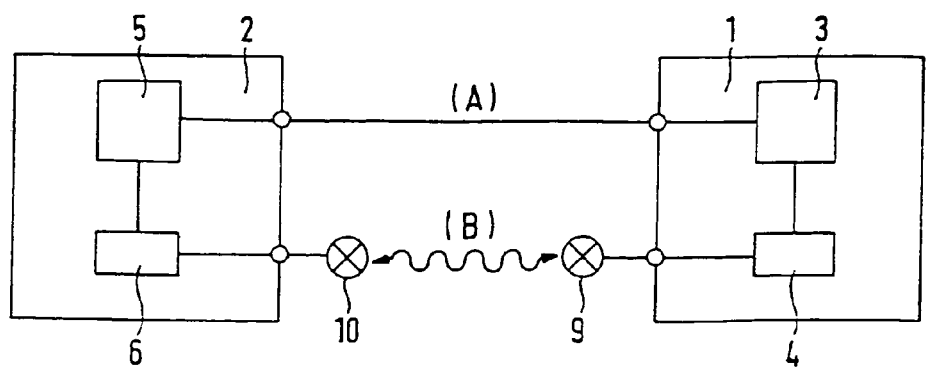
FIG. 6 shows a block diagram of an embodiment of the inventive system wherein data required for authenticity testing are transmitted contactlessly between external device and data carrier.

FIG. 6 shows a block diagram of a variant of the inventive system wherein transmission channels A for standard data and B for authenticity data are physically separated, standard data being transmitted via a line and authenticity data contactlessly using two transceivers 9 and 10. Transceivers 9 and 10 are each connected with one of additional apparatuses 4 and 6. Additional apparatus 4 of chip card 1 is further connected with microcontroller 3 connected to the standard data line (trans-mission channel A). Additional apparatus 6 of the external device is also connected with microcontroller 5 again connected to the standard data line. Contactless data transmission between transceivers 9 and 10 can be realized in different ways. For example, one can use forms of transmission customary in the area of chip card technology via electromagnetic waves, magnetic or electric fields and light in the visible or invisible range. If an especially high security standard is to be attained, one selects the form of transmission so that it cannot be performed with conventional chip cards but necessitates special hardware. In this connection one can improve the security standard even further if the additionally required hardware presupposes a very high measure of know-how, is inaccessible to an unauthorized third party and/or can be realized only with complex and costly equipment. For example, one can use for transmission radiation-induced luminescence or electroluminescence of a suitable material. It is also expedient to dispose the luminescent material on the chip card in a special pattern in order to impede reproduction further. One can also use a certain spatial arrangement of different receivers and transmitters so that reproduction from discrete components is extremely difficult. One can likewise use luminescent materials which are very hard to procure, and to mislead an unauthorized third party one can use a mixture of wavelengths for data transmission, the information being contained only in a single wavelength or having to be combined from information portions scattered over different wavelengths, etc.

A further variant of data transmission is to subject chip card 1 to a high-frequency pulse whereupon chip card 1 modulates the high-frequency pulse and sends it back to the external device.

In all variants, reproduction or manipulation of chip card 1 or external device 2 can also be impeded if additional apparatus 4, 6 is coupled to microcontroller 3, 5 and works properly only if this connection actually exists. This coupling impedes imitation of additional apparatus 4, 6 by means of discrete components when microcontroller 3, 5 offers no simple possibility of external coupling.

Chip card 1 can be executed as a contact-type chip card wherein standard data are transmitted via one or more contact surfaces. Chip card 1 can also be executed as a contactless chip card wherein standard data are transmitted contactlessly.

The invention claimed is:

1. A method for conducting an authenticated data exchange transaction between a data carrier having an integrated circuit and an external device with which the data carrier exchanges data, comprising the steps of:
    establishing a first bidirectional transmission channel between the data carrier and the external device, the first bidirectional transmission channel being configured to exchange signals having signal patterns between the data carrier and the external device;
    establishing a second bidirectional transmission channel between the data carrier and the external device, the second bidirectional transmission channel being configured to exchange signals having signal patterns between the data carrier and the external device, wherein the second bidirectional transmission channel is logically separated from the first bidirectional transmission channel, the separation of the first and second bidirectional transmission channels being such that data transmission via one bidirectional transmission channel does not interfere with data transmission via the other bidirectional transmission channel and the second bidirectional transmission channel is activable during the total time period between activation and deactivation of the data carrier; and
    conducting the authenticated data exchange transaction between the data carrier and the external device wherein authentication data and transaction data associated with the authentication data are exchanged between the data carrier and the external device in part via the first bidirectional transmission channel and in part via the second bidirectional transmission channel, comprising
    having the data carrier generate a signal required for authenticity testing;
    transmitting the signal for authenticity testing from the data carrier to the external device or a signal required for generating the signal for authenticity testing from the external device to the data carrier at least partly via the second bidirectional transmission channel; and
    having the external device receive the signal for authenticity testing, and deciding on the basis of the received signal whether the data carrier is authentic.

2. The method according to claim 1, characterized in that the second bidirectional transmission channel is provided by modulating the signal of the first bidirectional transmission channel.

3. The method according to claim 2, characterized in that modulation does not impair an ISO compatibility of data exchange between the data carrier and the external device existing for the first bidirectional transmission channel.

4. The method according to claim 2, characterized in that modulation is performed in areas of the signal pattern which are not evaluated according to ISO 7816.

5. The method according to claim 2, characterized in that the changes caused by modulation in the signal of the first bidirectional transmission channel are within the range of variation of the signal level permitted by ISO 7816.

6. The method according to claim 2, characterized in that modulation and demodulation of the signal are performed in the data carrier and in the external device with the aid of a mixing/demixing device in each case.

7. The method according to claim 1, characterized in that the first bidirectional transmission channel is a line for transmitting standard data or a line for transmitting a clock signal or a line for supply voltage.

8. The method according to claim 1, characterized in that the decision on authenticity of the data carrier is contingent on whether data exchange is possible between the devices to which the first and second bidirectional transmission channels are coupled in the data carrier.

9. A method for conducting an authenticated data exchange transaction between a data carrier having an integrated circuit and an external device with which the data carrier exchanges data, comprising the steps of:
  establishing a first bidirectional transmission channel between the data carrier and the external device, the first bidirectional transmission channel being configured to exchange signals having signal patterns between the data carrier and the external device according to an ISO standard for a chip card;
  establishing a second bidirectional transmission channel between the data carrier and the external device, the second bidirectional transmission channel being configured to exchange signals having signal patterns between the data carrier and the external device, wherein the second bidirectional transmission channel is physically separated from the first bidirectional transmission channel and comprising at least one line or contactless transmission path not provided according to the ISO standard for a chip card, the second bidirectional transmission channel being activable during the total time period between activation and deactivation of the data carrier; and
  conducting the authenticated data exchange transaction between the data carrier and the external device wherein authentication data and transaction data associated with the authentication data are exchanged between the data carrier and the external device in part via the first bidirectional transmission channel and in part via the second bidirectional transmission channel, comprising
    having the data carrier generate a signal required for authenticity testing;
    transmitting the signal for authenticity testing from the data carrier to the external device or a signal required for generating said signal for authenticity testing from the external device to the data carrier at least partly via the second bidirectional transmission channel; and
    having the external device receive the signal for authenticity testing, and deciding on the basis of the received signal whether the data carrier is authentic.

10. The method according to claim 9, characterized in that the contactless transmission path is realized by transmitting the data as electromagnetic, electrostatic, magnetic, acoustic or optical signals.

11. The method according to claim 10, characterized in that a mixture of wavelengths is used for transmission via the contactless transmission path.

12. A data carrier which can exchange data with an external device and has an integrated circuit, wherein
  the data carrier has a first device configured to generate signals for data exchange between the data carrier and the external device via a first bidirectional transmission channel,
  the data carrier has a second device configured to generate signals required for authenticity testing of the data carrier, the second device being configured to exchange data between the data carrier and the external device via a second bidirectional transmission channel, the second device being connected with the first device,
  wherein the first and second bidirectional transmission channels are separated logically or physically, and
  data exchange with the second device does not interfere with data exchange with the first device, and the second device is ready for generating signals for authenticity testing of the data carrier during the total time period between activation and deactivation of the data carrier;
  wherein the data carrier is configured to exchange authentication data and transaction data associated with the authentication between the data carrier and the external device in part via the first bidirectional transmission channel and in part via the second bidirectional transmission channel.

13. The data carrier according to claim 12, wherein the first device and the second device are each coupled to the bidirectional transmission channels via a mixing/demixing module.

14. A system for testing the authenticity of a data carrier and/or an external device comprising:
  a data carrier with a first device configured to generate signals for data exchange with the external device and a second device configured to generate or process signals for authenticity testing,
  an external device with a first device configured to generate signals for data exchange with the data carrier and a second device configured to generate or process signals for authenticity testing,
  a first bidirectional transmission channel configured to transmit signals between the first device of the data carrier and the first device of the external device,
  and a second bidirectional transmission channel configured to transmit signals between the second device of the data carrier and the second device of the external device, the first and second bidirectional transmission channels being separated logically or physically and the separation of the first and second bidirectional transmission channels being so designed that data transmission via one bidirectional transmission channel does not interfere with data transmission via the other bidirectional transmission channel, and the second bidirectional transmission channel being activable during the total time period between activation and deactivation of the data carrier;
  wherein the data carrier and the external device are configured to exchange authentication data and transaction data associated with the authentication between the data carrier and the external device in part via the first bidirectional transmission channel and in part via the second bidirectional transmission channel.

* * * * *